United States Patent
Wang et al.

(10) Patent No.: US 10,246,934 B2
(45) Date of Patent: Apr. 2, 2019

(54) DOOR COMPRISING VERMICULITE-CONTAINING CORE, AND METHOD OF MAKING THE SAME

(71) Applicant: Plastpro 2000, Inc., Los Angeles, CA (US)

(72) Inventors: Shirley Wang, Los Angeles, CA (US); Jared Andrew Garrett, Mentor, OH (US); Scott Evert Johnson, Kingsville, OH (US); Sungtse Lin, Rancho Palos Verdes, CA (US)

(73) Assignee: PLASTPRO 2000, INC., Los Angeles, CA (US)

( * ) Notice: Subject to any disclaimer, the term of this patent is extended or adjusted under 35 U.S.C. 154(b) by 0 days.

(21) Appl. No.: 15/849,941

(22) Filed: Dec. 21, 2017

(65) Prior Publication Data

US 2018/0179807 A1    Jun. 28, 2018

Related U.S. Application Data (60) Provisional application No. 62/438,720, filed on Dec. 23, 2016.

(51) Int. Cl.

| | |
|---|---|
| *E06B 5/20* | (2006.01) |
| *E06B 3/70* | (2006.01) |
| *E06B 3/78* | (2006.01) |
| *C04B 28/26* | (2006.01) |
| *C04B 14/20* | (2006.01) |
| *C04B 20/06* | (2006.01) |

(52) U.S. Cl.
CPC ............. *E06B 5/20* (2013.01); *E06B 3/7001* (2013.01); *E06B 3/7015* (2013.01); *E06B 3/78* (2013.01); *C04B 14/202* (2013.01); *C04B 14/204* (2013.01); *C04B 20/06* (2013.01); *C04B 28/26* (2013.01); *E06B 2003/704* (2013.01)

(58) Field of Classification Search
CPC ... E06B 5/20; E06B 3/78; C04B 20/06; C04B 14/202
USPC .................... 52/232, 783.13, 784.11, 784.15
See application file for complete search history.

(56) References Cited

U.S. PATENT DOCUMENTS

| | | |
|---|---|---|
| 3,015,626 A | 1/1962 | Kingsbury et al. |
| 4,075,804 A | 2/1978 | Zimmerman |
| 4,159,302 A | 6/1979 | Greve et al. |
| 4,343,127 A | 8/1982 | Greve et al. |
| 4,746,555 A | 5/1988 | Luckanuck |
| 5,045,385 A | 9/1991 | Luckanuck |

(Continued)

FOREIGN PATENT DOCUMENTS

| | | |
|---|---|---|
| CN | 2080551 U | 7/1991 |
| CN | 201024858 Y | 2/2008 |

(Continued)

*Primary Examiner* — Brian E Glessner
*Assistant Examiner* — Adam G Barlow
(74) *Attorney, Agent, or Firm* — Duane Morris LLP (57) ABSTRACT

A door for attenuating sound includes at least one core disposed between a front surface and a back surface. The at least one core includes a composition comprising vermiculite, for example, expanded vermiculite, and an inorganic bonding agent. Such a composition for the core has a density of at least 600 Kg/m³. The door has at least a sound transmission class (STC) rating or an outdoors/indoors transmission coefficient (OITC) being higher than 30.

18 Claims, 10 Drawing Sheets

(56) References Cited

U.S. PATENT DOCUMENTS

| | | |
|---|---|---|
| 5,155,959 A | 10/1992 | Richards et al. |
| 5,171,366 A | 12/1992 | Richards et al. |
| 5,305,577 A | 4/1994 | Richards et al. |
| 5,798,010 A | 8/1998 | Richards et al. |
| 5,956,902 A | 9/1999 | Cosby |
| 6,271,156 B1 | 8/2001 | Gleason et al. |
| 6,290,769 B1 | 9/2001 | Carkner |
| 6,340,389 B1 | 1/2002 | Klus |
| 6,399,214 B1 | 6/2002 | Schou |
| 6,406,755 B1 * | 6/2002 | Kindt .................. C04B 28/14 106/18.11 |
| 6,554,893 B2 * | 4/2003 | Klus .................. C04B 14/185 106/18.12 |
| 6,643,991 B1 * | 11/2003 | Moyes .................. E06B 5/16 428/902 |
| 6,773,639 B2 | 8/2004 | Moyes et al. |
| 6,846,358 B2 | 1/2005 | Francis |
| 6,986,656 B2 | 1/2006 | Moyes et al. |
| 7,181,891 B2 | 2/2007 | Surace et al. |
| 7,211,318 B2 | 5/2007 | Lee et al. |
| 7,921,965 B1 | 4/2011 | Surace |
| 8,088,217 B2 | 1/2012 | Francis |
| 8,181,417 B2 | 5/2012 | Surace et al. |
| 8,221,542 B2 | 7/2012 | Francis |
| 8,627,922 B2 | 1/2014 | Fournier et al. |
| 8,673,201 B2 | 3/2014 | Francis |
| RE45,144 E | 9/2014 | Shore et al. |
| 8,915,033 B2 * | 12/2014 | Daniels .................. E06B 3/822 52/232 |
| 9,027,296 B2 | 5/2015 | Daniels et al. |
| 9,080,372 B2 | 6/2015 | Daniels et al. |
| 2014/0000193 A1 * | 1/2014 | Daniels .................. E06B 3/822 52/232 |
| 2014/0054107 A1 * | 2/2014 | Thomas .................. E04B 1/84 181/290 |
| 2015/0010750 A1 | 1/2015 | Zhou |
| 2015/0240163 A1 * | 8/2015 | Welker .................. C04B 28/02 264/128 |
| 2015/0292841 A1 * | 10/2015 | Fultz .................. F41H 5/226 89/36.04 |

FOREIGN PATENT DOCUMENTS

| | | |
|---|---|---|
| CN | 201133200 Y | 10/2008 |
| CN | 102584163 A | 7/2012 |
| CN | 104213814 A | 12/2014 |

* cited by examiner

DOOR COMPRISING VERMICULITE-CONTAINING CORE, AND METHOD OF MAKING THE SAME

PRIORITY CLAIM AND CROSS-REFERENCE

This application claims the benefit of U.S. Provisional Application No. 62/438,720, filed Dec. 23, 2016, which application is expressly incorporated by reference herein in its entirety.

FIELD

The disclosure relates to a door generally. More particularly, the disclosed subject matter relates to a sound-attenuating or soundproof door having a core, and the method of making the same.

BACKGROUND

Airborne sound generated outside a building can emanate from either human activities or from mechanical noise and travel through walls, doors, floor, and ceiling assemblies. Considerable attenuation is generally needed to reduce the sound level reaching occupants. Installation of sound-attenuating doors is a part of architectural acoustics noise control.

The sound-attenuating properties of a door are reflected in the difference between the incident sound intensity level imposed on one face of the door and the transmitted sound intensity level emanating from the opposite face. The difference is called the "transmission loss." This loss is measured in decibels on a logarithmic scale with higher numbers indicating that the structure is more capable of insulting a space from or attenuating outside noise.

SUMMARY

The present disclosure provides a door for attenuating sound and a method of making the same. More particularly, the present disclosure provides a sound-attenuating or soundproof door having a core, which comprises a composition comprising vermiculite, such as expanded vermiculite, and an inorganic bonding agent.

In one aspect, a door having sound-attenuating properties is provided. The door comprises at least two skins including a first skin providing a front surface and a second skin providing a back surface, and at least one core (e.g., one or more cores) disposed between the front and the back surfaces. The at least one core comprises a composition comprising vermiculite (e.g., expanded vermiculite) and an inorganic bonding agent. Such a composition for the core has a density of at least 600 Kg/m$^3$. For example, the core composition may have a density in the range from about 600 Kg/m$^3$ to 3,000 Kg/m$^3$ (e.g., 600-1,000 Kg/m$^3$, 600-2,000 Kg/m$^3$, 1,000-2,000 Kg/m$^3$, or any other suitable range). The door has at least a sound transmission class (STC) rating or an outdoor/indoor transmission coefficient (OITC) being higher than 30. In some embodiments, the door has an STC or an OITC rating in the range from about 30 to about 40 (e.g., 30-35, or 33-35). The door can attenuate airborne sound, and absorb, insulate and reduce noise level. In some embodiments, the door is referred to as an "acoustical door" or a "sound barrier door."

The door further comprises stiles aligned vertically along two vertical edges of the door, and rails aligned horizontally along two horizontal edges of the door. In some embodiments, the skins comprise a material of a glass fiber or mineral reinforced polymer composite. The polymer can be any suitable polymer, for example, cured from unsaturated polyester or polybutadiene. The door has a rectangular shape and the core is disposed between the stiles and the rails. In some embodiments, the stiles comprise laminated veneer lumber (LVL); and the rails comprise a composite comprising wood and polyvinyl chloride.

In some embodiments, the inorganic bonding agent in the composition for the at least one core comprises $Na_2SiO_3$, $SiO_2$, and $CaCO_3$. For example, the inorganic bonding agent comprises $Na_2SiO_3$, $SiO_2$, and $CaCO_3$ in a ratio from 2:7:1 to 7:2:1 by weight. Amorphous $SiO_2$ may be used. The composition in the at least one core comprises vermiculite in the range of from about 50% to about 99% by weight (e.g., 60-95%, 65-95%, 70-95%, and 75-95%) and an inorganic bonding agent in the range of from about 1% to 50% by weight (e.g., 4-40% or 5-25%) based on the total weight of the composition.

The door also comprises a glue for bonding the at least one core to the stiles and rails. Such a glue can be an inorganic glue, a polymer hot melt adhesive (e.g., polyurethane or polyolefin based), or a thermosetting based polymer adhesive (e.g., epoxy, urethane-based). In some embodiments, an inorganic glue comprises $Na_2SiO_3$, $MgSiO_3$, and $CaSiO_3$. The glue is different from the bonding agent used in the vermiculite containing core.

In some embodiments, the door also comprises a reinforcing structure for reinforcing the at least one core comprising vermiculite. The reinforcing structure is disposed between the at least two skins and the at least one core. The reinforcing structure may be a metal structure fixed onto the at least one core using screws.

In another aspect, the present disclosure also provides a method of making the door described above. Such a method comprises a step of forming at least one core for a door comprising vermiculite and the inorganic bonding agent. In some embodiments, the step of forming the core comprises the steps of: expanding vermiculite particles to form expanded vermiculite; forming a mixture of expanded vermiculite with the inorganic bonding agent during a moistened state; and molding the mixture of expanded vermiculite with the inorganic bonding agent at an increased temperature under compression so as to form a panel for the core. The method of making a door may further comprise bonding the at least one core with the stiles aligned along two first edges of the core and aligning the rails two second edges of the core, and applying at least two skins to the at least one core. A first skin (front skin) is applied onto a front side and a second skin (back skin) is applied onto a back side of the at least one core. Forming the door also includes other steps for bonding and/or assembling the door. For example, for bonding the various components together to assemble the door, a number of bonding agents may be used, such as an inorganic glue (different from the inorganic bonding agent for the core), a polymer hot melt adhesive (e.g., polyurethane or polyolefin based), or a thermosetting based polymer adhesive (e.g., epoxy, urethane-based). In some embodiments, polyurethane reactive hot melt adhesive or a polyolefin based adhesive is used for bonding, for example, a composite cap to the LVL or Engineered wood.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive; as another example, the phrase "about 8%" preferably (but not always) refers to a value of 7.2% to 8.8%, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Laminated layers of various materials, such as fiberboard, metal and glass wool, are employed in producing sound insulating walls and panels but have not been adapted successfully to acoustical doors. There continues to be a need for a sound insulating door of conventional size and thickness, which is economical to produce and which possesses a high sound transmission loss rating.

The present disclosure provides a door for attenuating sound having at least one core comprising vermiculite, such as expanded vermiculite, and an inorganic bonding agent, and a method of making such a door. The door comprises at least two skins including a first skin (a front skin) and a second skin (a back skin) which provide a first (e.g., a front) surface and a second (e.g., a back) surface, and at least one core (e.g., 1, 2, 3, 4 cores) disposed between the front and the back surfaces. Each core may be in a shape of a rectangle or square in some embodiments, although the core may have other geometric shapes. The at least one core comprises a composition comprising vermiculite, preferably expanded vermiculite, and an inorganic bonding agent. The inventors have surprisingly found that when such a composition for the core has a density of at least 600 Kg/m$^3$, for example, in the range from about 600 Kg/m$^3$ to about 3,000 Kg/m$^3$, the resulting door having such a core has excellent acoustic (e.g., sound attenuating) performance. For example, the door has a sound transmission class (STC) rating or an outdoors/indoors transmission coefficient (OITC) being higher than 30. In some embodiments, the door has an STC or an OITC rating in the range from about 30 to about 40 (e.g., 30-35, or 33-35). The door can attenuate airborne sound, and absorb, insulate and reduce noise level.

In some embodiments, the composition comprising vermiculite has a density in the range from about 600 Kg/m$^3$ to about 1,000 Kg/m$^3$, from about 600 Kg/m$^3$ to 2,000 Kg/m$^3$, 600-2,000 Kg/m$^3$, from about 1,000 Kg/m$^3$ to 2,000 Kg/m$^3$, or any other suitable range.

The inorganic bonding agent in the composition for the at least one core can be any suitable bonding agent. For example, the inorganic bonding agent used comprises sodium silicate ($Na_2SiO_3$), silica dioxide ($SiO_2$), and calcium carbonate $CaCO_3$. The ingredients of $Na_2SiO_3$, $SiO_2$, and $CaCO_3$ may have a ratio from 2:7:1 to 7:2:1 by weight. $SiO_2$ may be amorphous. Vermiculite may be in the range of from about 50% to about 99% by weight. For example, in some embodiments vermiculite is in the range of from about 60% to about 95%, or from about 75% to about 95%. The inorganic bonding agent may be in the range of from about 1% to 50% by weight (e.g., 4-40% or 5-25%) based on the total weight of the composition.

The door further comprises stiles aligned vertically along two vertical edges of the door, and rails aligned horizontally along two horizontal edges of the door. In some embodiments, the door comprises at least two stiles aligned in a first direction (vertical direction), and at least two rails aligned in a second direction (horizontal direction). The at least two stiles include a first stile along a first edge of the door and a second stile aligned along a second edge of the door. The at least two rails include a first rail along a third edge of the door and a second rail along a fourth edge of the door.

The skins may comprise a material of a glass fiber reinforced and mineral filled polymer composite, in which the polymer can be any suitable polymer, for example, cured from unsaturated polyester or polybutadiene. The door may have a rectangular shape with the core disposed between the stiles and the rails. The stiles comprise laminated veneer lumber (LVL); and the rails comprise a composite comprising wood and polyvinyl chloride.

The at least one core may be bonded to the stiles and rails using a glue, which has a composition different from the inorganic bonding agent used in the core. Such a glue can be an inorganic glue, a polymer hot melt adhesive (e.g., polyurethane or polyolefin based), or a thermosetting-based polymer adhesive (e.g., epoxy, urethane-based). References to an "inorganic glue" made herein are understood to encompass a chemical agent used for bonding the door core to the stiles and/or rails. References to an "inorganic agent" made herein are understood to encompass a chemical composition used for bonding vermiculite in the door core. The compositions of an inorganic glue and an inorganic bonding agent may be different.

In some embodiments, an inorganic based glue, for example, comprising $Na_2SiO_3$, $MgSiO_3$, and $CaSiO_3$ is used. In some embodiments, polyurethane reactive hot melt adhesive or a polyolefin-based adhesive is used for bonding, for example, a composite cap to the LVL or engineered wood. For example, a polyurethane reactive hot melt adhesive, DURAPRO UH-2125-1, is from IFS Industries, Inc. (Reading, Pa.). DURAPRO UH-2125-1 contains methylene bispenyl isocyanate and other polymer ingredients.

Referring to FIGS. 1A-1G, an exemplary door 10 in accordance with some embodiments comprises skins 12 comprising a first skin 12-1 and a second skin 12-2 forming the front and back surfaces of the exemplary door 10, vertical stiles 14 (including, for example, a left stile 14-1 and a right stile 14-2), at least one core 16, and horizontal rails 18 (including, for example, a top rail 18-1 and a bottom rail 18-2). The at least one core 16 is disposed between the first skin 12-1 and a second skin 12-2. The core 16 is also disposed between left and right stiles 14-1, 14-2, and between top rail and bottom rails 18-1, 18-2. The at least one core 16 includes one or more (e.g., two, three, four, five, six, seven, or eight) pieces of cores, which are encased by the skins 12, stiles 14, and rails 18. The at least one core 16 comprises a vermiculite-containing composition as described herein.

In some embodiments, the skins 12 comprise fiber glass composite or any other suitable material. The stiles 14 is made of laminated veneer lumber (LVL) or any other suitable material. The rails 18 are made of a wood flour/PVC (polyvinyl chloride) composite or any other suitable material. In some embodiments, the skins 12 may have ribs and flanges, while the stiles 14 and the rails 18 contain grooves. The ribs and flanges may be inserted into corresponding grooves to include mechanical interlocking.

In some embodiments, the composition for the core 16 comprises expanded vermiculite (e.g., "80-83" wt. %); and an inorganic bonding agent (e.g., "20-17" wt. %). The chemical composition of the inorganic bonding agent for bonding vermiculite in the door core includes: $Na_2SiO_3$ (e.g., 27%); $SiO_2$ (e.g., 23%); $CaCO_3$ (e.g., 5%); and $H_2O$ (e.g., 45%) before drying. Water in the formulation dries and evaporates during a production process. The water content in the composition for the core or cores is less than 5% or even lower (for examples, less than 1%, 0.5%). The chemical composition of an exemplary door core panel is as follows: $Na_2SiO_3$ (e.g., 50%); $SiO_2$ (e.g., 16%); $CaCO_3$ (e.g., 15%); $2SiO_2.Al_2O_3.2H_2O$ (e.g., 5%); FeO (e.g., 3%); MgO (e.g., 9%); and other impurities (e.g., 2%). The $SiO_2$ used is amorphous, and that no perlite exists in the exemplary door core.

A glue, which may be different from the bonding agent used in the core(s), is used to bond the door core(s) to the stiles and the rails. Such a glue may have a composition as follows: $Na_2SiO_3$ (e.g., 45%); $MgSiO_3$ (e.g., 2.5%); $CaSiO_3$ (e.g., 2.5%); and $H_2O$ (e.g., 50%) before drying. In some embodiments, a polyurethane reactive hot melt adhesive, such as DURAPRO UH-2125-1, or polyolefin based adhesive may be used. Any other suitable organic or inorganic adhesive can also be used.

The composition for the core may have a density of in the range from about 600 $Kg/m^3$ to about 700 $Kg/m^3$. A variation for density data, for example, 600 $Kg/m^3$, may be minus or plus 50 $Kg/m^3$.

The present disclosure also provide a kit or a product comprising the components described herein, and a resulting sound barrier door assembly. In some embodiments, a sound barrier door assembly comprises at least two skins 12 (outer skins), at least two stiles 14, at least one core 16 (inner core), and at least two rails 18. The skins 12 are fiberglass door skins, and the at least one core 16 is a high density vermiculite-containing core in some embodiments. The horizontal top and bottom rails 18 comprise a wood flour/polyvinyl chloride composite material. The outer vertical stiles 14 comprise polyvinyl chloride exterior cap bonded to a laminated veneer or engineered structural lumber. The skins 12 comprise a match-molded high-compression unsaturated polyester and or poly-butadiene, glass-fiber-reinforced, mineral-filled composite material. The at least one core 16 comprises expanded vermiculite ore bonded under heat and compression in some embodiments. Fiberglass exterior doors are fully enveloped in composite material that is resistant to water absorption, and impact.

Figure 1A:
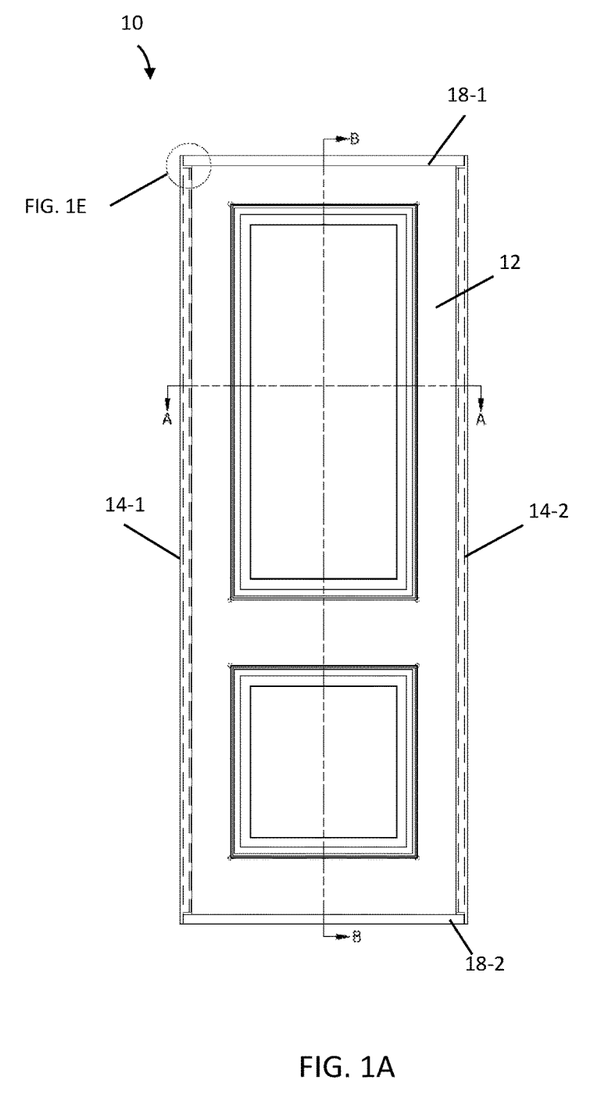
FIG. 1A is a plan view of an exemplary door in accordance with some embodiments.
Figure 1B:
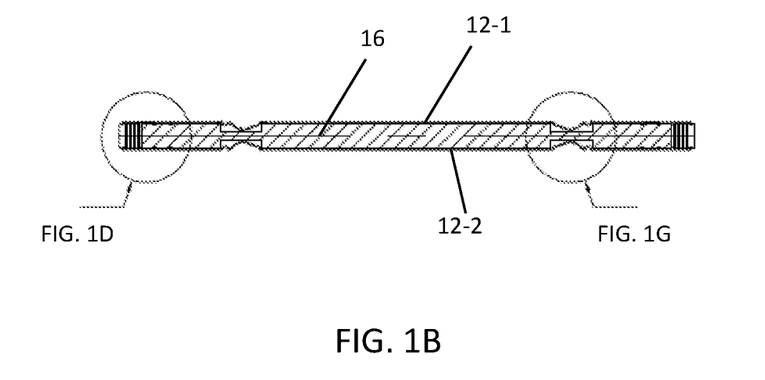
FIGS. 1B and 1C are cross-sectional views in horizontal and vertical directions illustrating the exemplary door of FIG. 1A.
Figure 1C:
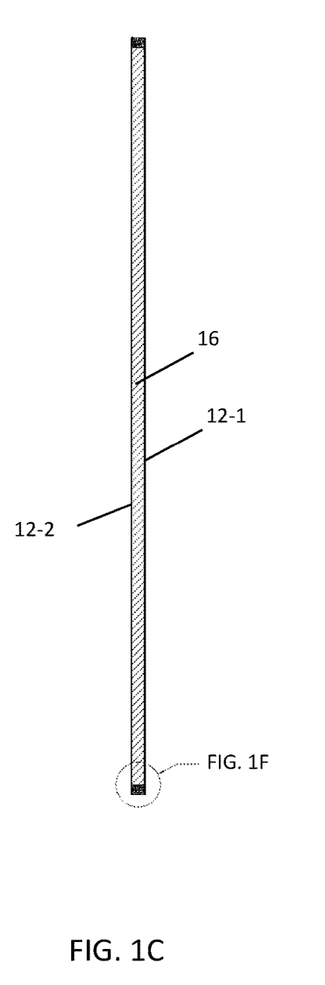
Figure 1D:
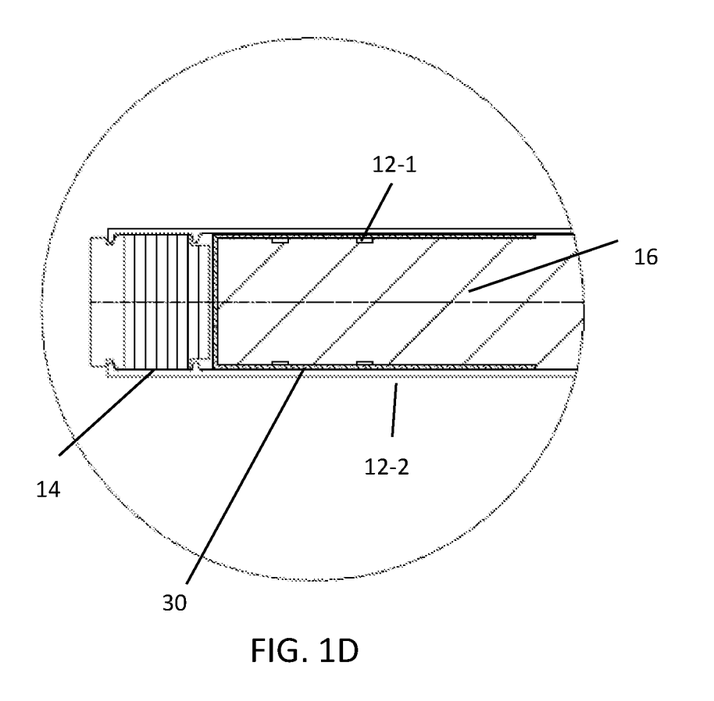
FIGS. 1D-1G are enlarged details of the exemplary door of FIG. 1A in accordance with some embodiments.
Figure 1E:
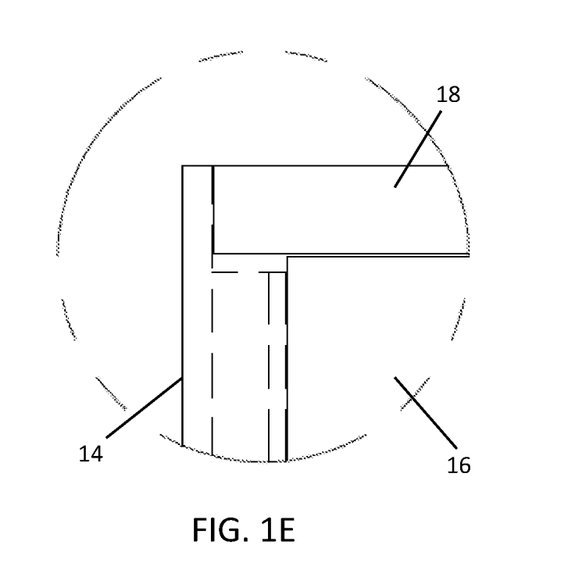
Figure 1F:
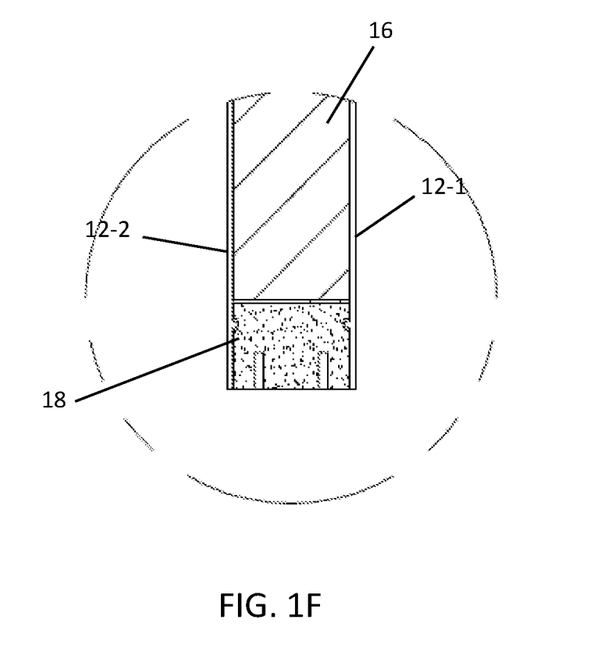
Figure 1G:
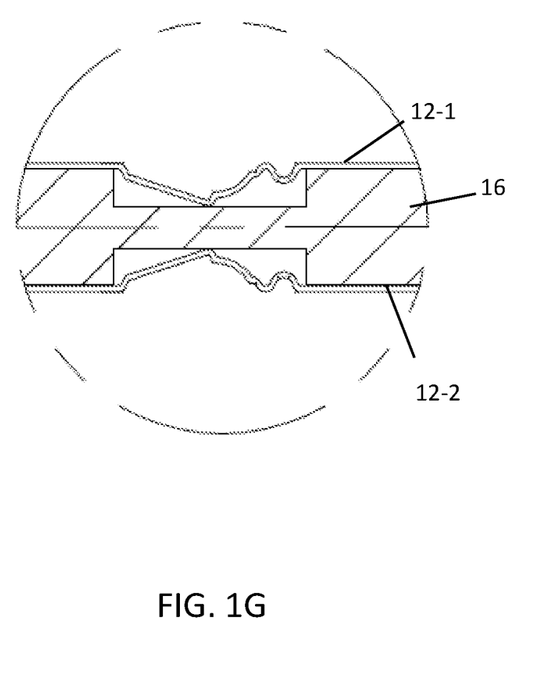
Figure 2A:
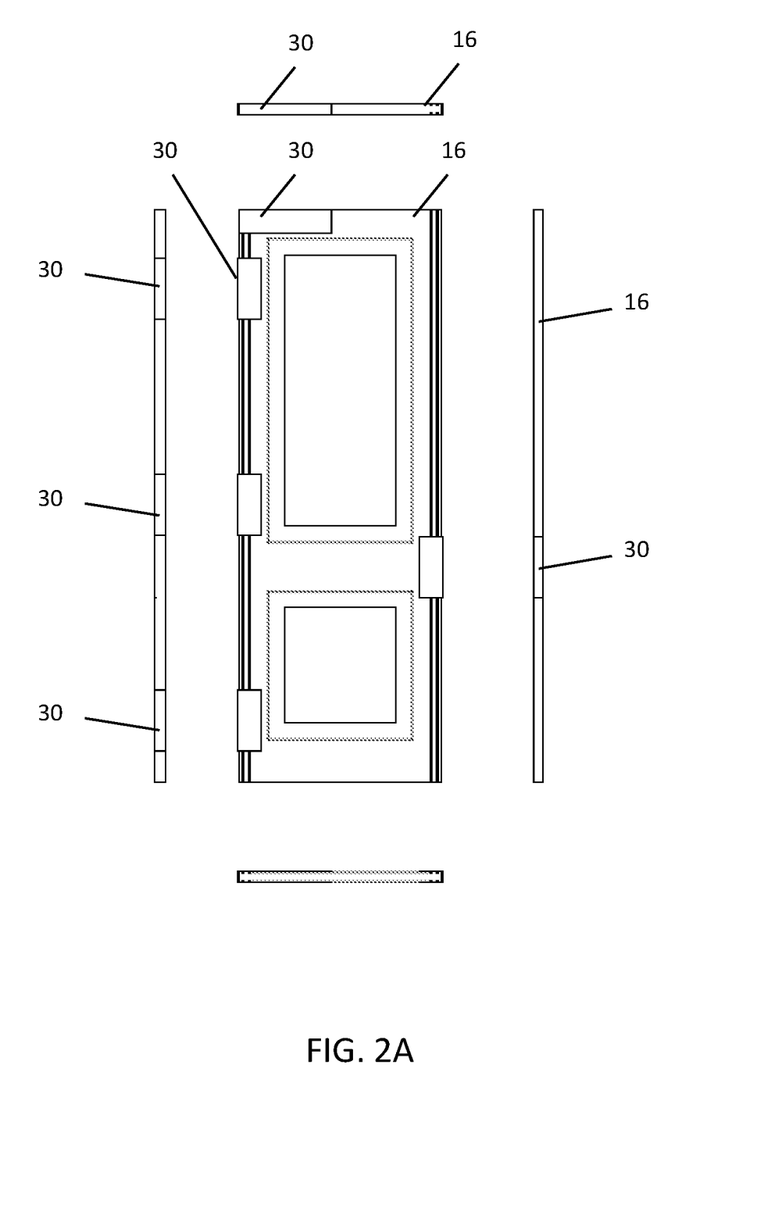
FIG. 2A is an exploded view of an exemplary reinforced core in accordance with some embodiments.
Figure 2B:
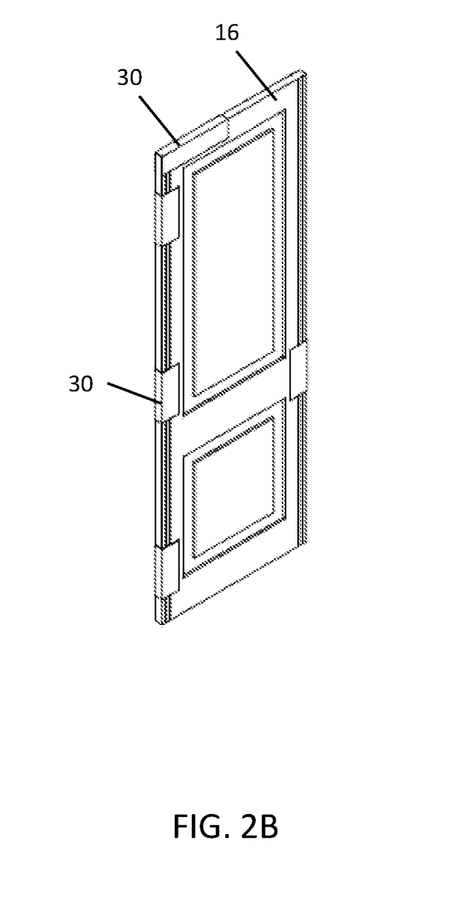
FIGS. 2B-2C are perspective views showing the exemplary reinforced core of FIG. 2A.
Figure 2C:
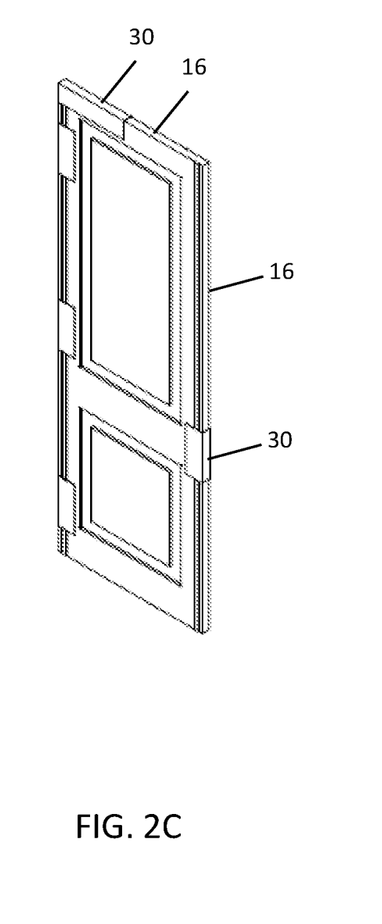
Figure 2D:
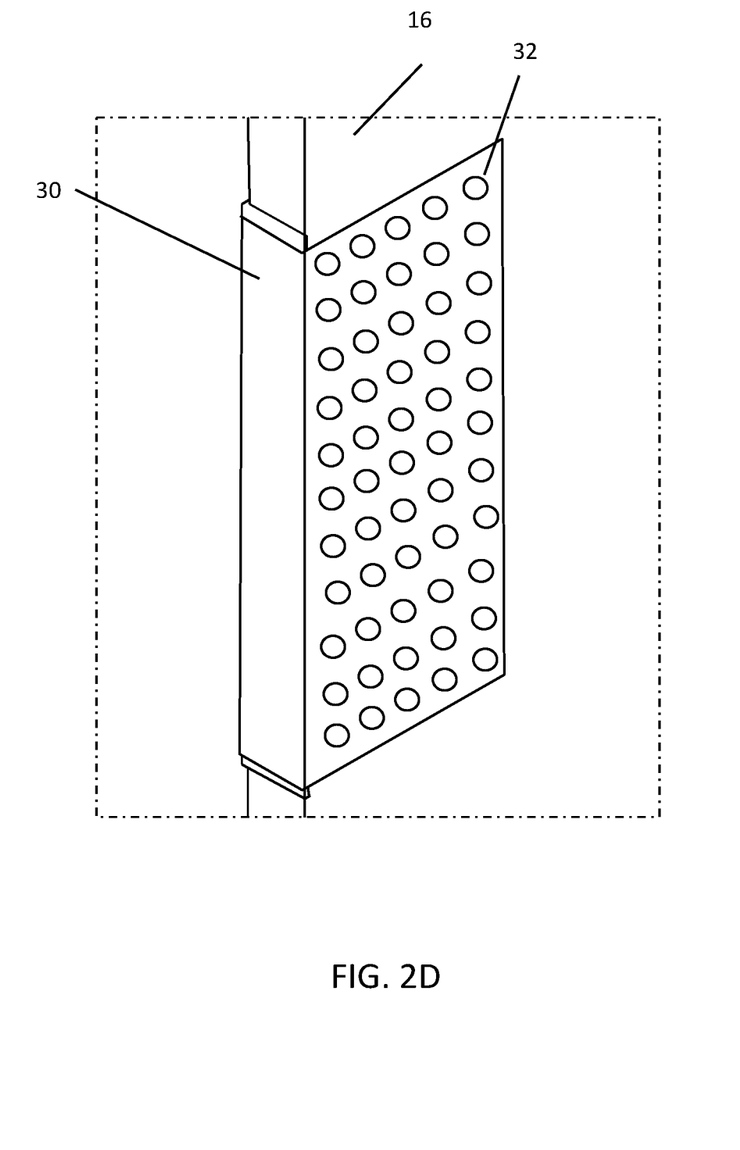
FIG. 2D is a perspective view showing the enlarged details having one portion of the reinforced core of FIG. 2A.

Referring to FIG. 1D and FIGS. 2A-2D, in some embodiments, the door also comprises a reinforcing structure 30 for reinforcing the at least one core 16 comprising vermiculite. Referring to FIG. 1D, the reinforcing structure 30 is disposed between the at least two skins 12 and the at least one core 16. Referring to FIGS. 2A-2D, the reinforcing structure 30 may be a metal structure having a first and a second surfaces aligned along the front and the back surfaces of the core 16. The reinforcing structure 30 also have a third surface connected with and normal to the first and the second surfaces. The third surface is aligned with an edge of the core 16. The reinforcing structure 30 may sandwich a portion of the core between the first and the second surfaces of the reinforcing structure 30. A plurality of reinforcing structures 30 may be used in difference locations to reinforce the at least one core 16. Referring to FIG. 2D, the reinforcing structure 30 may also define one more holes 32 on each surface and can be fixed onto the at least one core 16 using screws.

The door or assembly has a high level of sound attenuation and acoustical performance. The door has a good sound STC rating or a good OITC rating.

The inventors have also found that when the density of the core composite comprising vermiculite is less than 600 $Kg/m^3$, the resulting door provides insufficient sound attenuation performance, and the door cores are difficult or impossible to be assembled because the core panel structure is not strong enough and the panel tends to break.

Figure 3A:
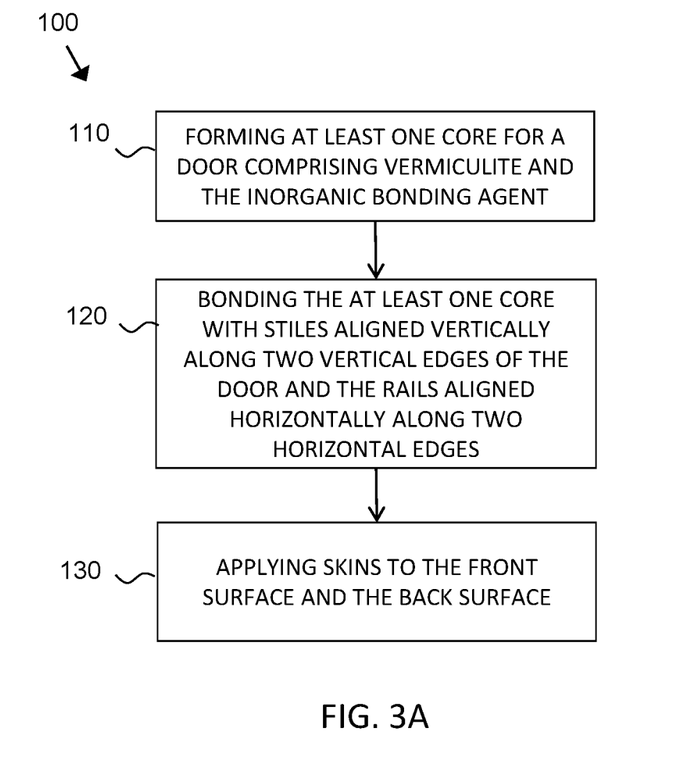
FIG. 3A is a flow chart illustrating an exemplary method for forming a door in accordance with some embodiments.
Figure 3B:
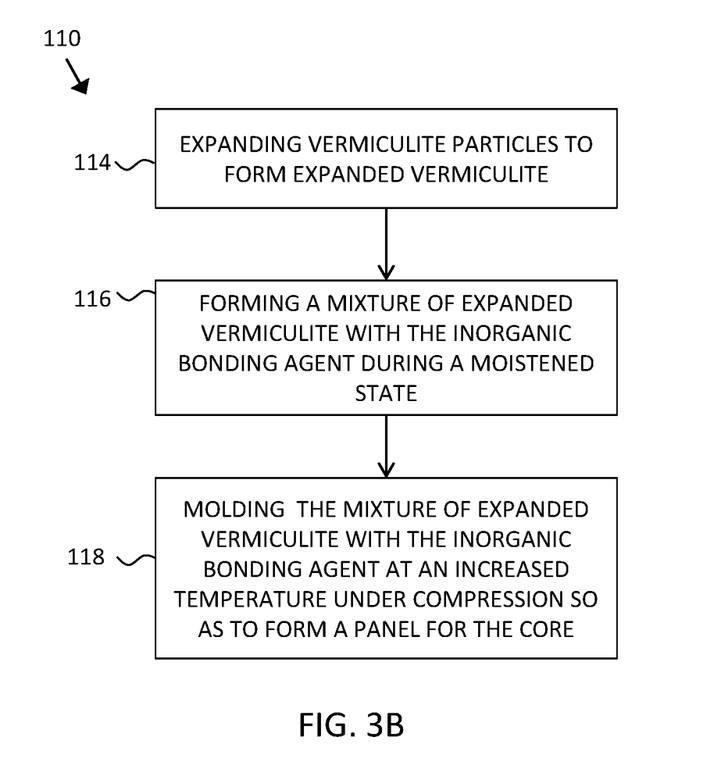
FIG. 3B is a flow chart illustrating an exemplary method for forming at least one core comprising vermiculite in accordance with some embodiments.

The present disclosure also provides a method of making the door described above. Referring to FIG. 3A, an exemplary method 100 is illustrated. At step 110, at least one core 16 for a door is formed. The at least one core 16 comprises vermiculite and the inorganic bonding agent. Referring to FIG. 3B, an exemplary method 100 of forming the at least one core 16 may comprise one or more of steps 114, 116, and 118.

At step 114, vermiculite particles can be expanded to form expanded vermiculite. At step 116, a mixture of expanded vermiculite with the inorganic bonding agent is formed. The mixture may contain water and is at a moistened state in some embodiments. At step 118, the mixture of expanded vermiculite with the inorganic bonding agent can be then spread and molded at an increased temperature, for example, at a temperature in the range of from about 100° C. to about 300° C. under compression so as to form a panel for the core. The panel is cooled down to room temperature after the molding step.

The exemplary method 100 may further comprise steps 120 and 130 of FIG. 3A. At step 120, the at least one core 16 is bonded with the stiles 14 aligned vertically along two vertical edges of the door and the rails 18 aligned horizontally along two horizontal edges, using the glue as described above. At step 130, two pieces of skins 12 can be applied to the front surface and the back surface of the at least one core to form the exterior surfaces of the door. The door may be further assembled with other components. In some embodiments, steps 120 and 130 can be performed sequentially or simultaneously. Such steps may be performed manually or automatically using robots.

For example, in some embodiments, a door is fabricated as follows: glue, such as polyurethane, is applied onto one side of two stiles 14 and one top rail 18-1, which are then attached onto a first skin 12-1. The stiles 14 and the top rail 18 may be attached onto the first skin 12-1 in an order of a first stile 14-1, a top rail 18-1, and then a second stile 14-2. The skins 12 may have ribs and flange, while the stiles 14 and the rails 18 contain grooves. The ribs and flange of the skin are positioned into the grooves of the stiles 14 and the top rail 18-1. Glue is then applied onto a first surface of one core 16. The core 16 with glue is covered with the assembly of the first skin 12-1, two stiles 14 and one top rail 18-1. The core 16 may have grooves, and the skin 12 may have corresponding ribs. The ribs and the grooves are matched with each other.

The resulting assembly is flipped while the first skin 12-1 faces down and a second surface of the core 16 faces up. One bottom rail 18-2 is attached to the first skin 12-1 using glue. The bottom rail 18-2 may also have grooves, which are to be aligned with the corresponding ribs of the skin 12-1. Glue is applied onto the second surface of the core 16, and corresponding upper surfaces of the stiles 14 and rails 18. Glue may fill any gap between any two of the stiles 14, the rails 18, and the core 16. A second skin 12-2 is placed on the second surface of the core 16, which has been applied with glue. Corresponding flanges on the skin 12 and grooves on the stiles 14 are aligned with each other, and corresponding ribs of the skin 12 and grooves of the core 16 also are aligned.

The glue is cured under pressure and heated if needed. For example, in some embodiments, the pressure may be in a range from about 0.2 MPa to 0.5 MPa (e.g., 0.3 or 0.4 MPa). The glue may be cured for a period of time in a range from 5 minutes to 30 minutes (e.g., 15 or 20 minutes).

The core 16 used may have any suitable thickness and weight. For example, the core may have a thickness of about 4 cm in some embodiments, although one of ordinary skill in the art will understand that thinner and thicker cores may be used. The weight of a core 16 may also depend on the design and the size of a door. For example, each core 16 may weigh in a range of from about 30 Kg to about 50 Kg. In some embodiments, a thicker core may provide a better sound attenuation than a thinner core having the same density. To achieve the same performance, a thinner core having a higher density may be used.

Doors having the structural characteristics were assembled as described herein and were tested for airborne sound transmission loss. The testing for airborne sound transmission loss of the door samples was performed at Architectural Testing Inc., and Intertek Company ("Intertek-ATI") in accordance with the following standards: (1) ASTM E90-09, Standard test method for laboratory measurement of airborne sound transmission loss of building partitions and elements; (2) ASTM E413-10, Classification of rating sound insulation; (3) ASTM E1332-10a, Standard classification for rating outdoor-indoor sound attenuation; and (4) ASTM E2235-04 (2012), Standard test method for determination of decay rates for use in sound insulation test methods. The measurements were conducted in the HT test chambers at Intertek-ATI located in York, Pa.

A frame for testing a specimen may depend on the size of the specimen. For example, a frame for a specimen may have a size of 2.07 meter (length)×0.95 meter (width)×0.12 meter (thickness). The corners are butted, screws are used as fasteners, and the frame is sealed using silicone. A sound transmission loss test was initially performed on a filler wall. A specimen plug was removed from the filler wall assembly. A specimen was placed on a foam isolation pad in the test opening. Duct seal was used to seal the perimeter of the specimen to the test opening on both sides. The interior side of the specimen, when installed, was approximately 0.635 centimeter from being flush with the receive room side of the filler wall. A stethoscope was used to check for any abnormal air leaks around the test specimen prior to testing. Operable portions of the test specimen, if any, were cycled at least five times prior to testing.

The sensitivity of the microphones was checked before measurements were conducted. The transmission loss values were obtained for a single direction of measurement. Two background noise sound pressure level and five sound absorption measurements were conducted at each of five microphone positions. Two sound pressure levels were made simultaneously in the receiver and source rooms at each of five microphone positions. The air temperature and relative humidity were also monitored and recorded during all measurement.

Transmission loss (TL) at each ⅓ octave frequency is the average source room sound pressure level minus the average receive room sound pressure level, plus, 10 times the log of the specimen area divided by the sound absorption of the receive room with the sample in place. The sound transmission class (STC) was obtained by reading the transmission loss of a contour curve at 500 Hz following ASTM E90-09. The sum of the deficiencies below the contour curve must not exceed 32. The maximum deficiency at any one frequency must not exceed 8. The outdoor-indoor transmission class (OITC) was calculated by subtracting the logarithmic summation of the transmission values from the logarithmic summation of the A-weighted transportation noise spectrum stated in ASTM E1332.

Figure 4:
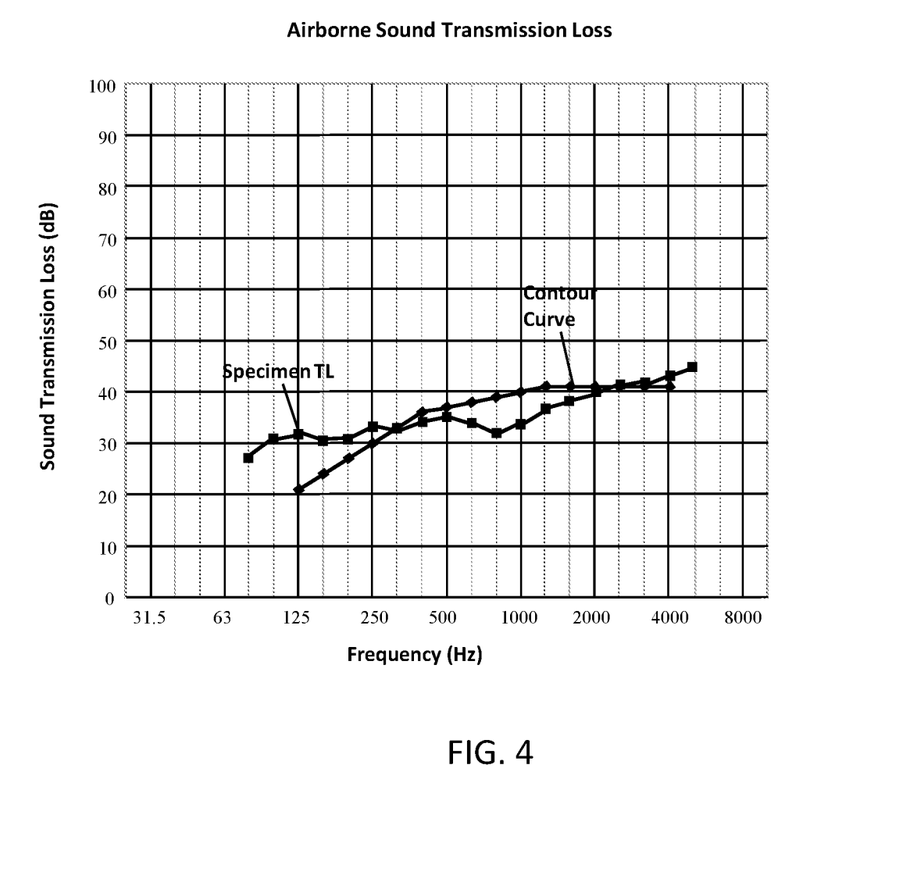
FIG. 4 shows exemplary results of airborne sound transmission loss of one exemplary specimen at different frequency in accordance with some embodiments.

FIG. 4 shows airborne sound transmission loss of one exemplary door at different frequency. Such a door included a core comprising vermiculite as described above, and was fixed on a wall and not hinged during the testing. This sample showed a STC of 37 and an OITC of 34.

Table 1 summarizes testing results of five examples and two comparative examples.

TABLE 1

| | Door Frame Size (meter × meter) | Series/Model | Glass | Testing Condition | STC | OITC |
|---|---|---|---|---|---|---|
| Comparative Ex. 1 | 0.914 × 2.438 | 3080 DRS 1Z 3080 N00X 26 × 89 Sound barrier | 1" IG (¼" laminated exterior, ½" air space, ¼" tempered interior) | Inoperable | 35 | 29 |
| Comparative Ex. 2 | 0.914 × 2.438 | 3080 DRS 1Z 3080 N00X 26 × 89 Sound barrier | 1" IG (¼" laminated exterior, ½" air space, ¼" tempered interior) | Operable | 35 | 29 |
| Comparative Ex. 3 | 0.914 × 2.438 | DRG 00 3080 90 minute | | Operable | 32 | 28 |
| Ex. 1 | 0.914 × 2.438 | DRS 2B 3080 V-Core | | Inoperable | 34 | 31 |
| Ex. 2 | 0.914 × 2.438 | DRS 2B 3080 V-Core | | Operable | 33 | 30 |
| Ex. 3 | 0.914 × 2.438 | DRS 00 3080 V-Core | | Operable | 34 | 30 |
| Ex. 4 | 0.914 × 2.033 | DRS 63 3068 V-Core | | Inoperable | 30 | 31 |
| Ex. 5 | 0.914 × 2.033 | DRS 63 3068 V-Core | | Operable | 29 | 30 |
| Ex. 6 | 0.914 × 2.033 | DRS 63 3068 V-Core | | Operable (threshold adjusted) | 29 | 30 |
| Ex. 7 | 0.914 × 2.033 | DRS 00 3068 V-Core | | Operable | 34 | 32 |

In Table 1, each sample was a single door. The first two comparative samples are two products comprising glass. The samples, which do not contain glass, are opaque. The door size "3-0/8-0" represents a door having 3×8 feet in dimension on its front or back profiles. The door size "3-0/6-8" represents a 3 feet×6 feet 8 inches door. "DRS" is a code for a design having smooth skin. "2B" is a code representing a design having two core panels. "V-core" denotes a core comprising vermiculite in accordance with some embodiments.

Under an "inoperable" testing condition, the door is not hinged but fixed on a wall, i.e., is not in an operable condition or state, and the testing provides maximized rating in general. Under an "operable" testing condition, the door is hinged such that it is in an operable condition or state. In STC testing, sound loss is measured while a frequency is gradually increased. In OITC testing, noises similar to real world are simulated. A higher value in both STC and OITC rating represents better performance.

The door with glass generally increases STC rating but OITC is very low. For most of existing opaque products, the STC or OITC rating is in the range from 25 to 29. Based on the testing results, the door provided in this disclosure provides excellent performance in both STC and OITC, and better performance compared to glass-containing doors and general opaque doors.

Although the subject matter has been described in terms of exemplary embodiments, it is not limited thereto. Rather, the appended claims should be construed broadly, to include other variants and embodiments, which may be made by those skilled in the art.

What is claimed is:

1. A door for attenuating sound comprising:
   at least two skins including a first skin and a second skin;
   at least one core disposed between the first skin and the second skin and comprising a composition comprising vermiculite and an inorganic bonding agent;
   at least two stiles aligned in a first direction, the at least two stiles including a first stile disposed along a first edge of the door and a second stile disposed along a second edge of the door; and
   at least two rails aligned in a second direction, the at least two rails including a first rail disposed along a third edge of the door and a second rail disposed along a fourth edge of the door;
   wherein the door has a rectangular shape and the at least one core is disposed in-between the at least two stiles and the at least two rails,
   wherein the at least two skins comprises a material of a glass fiber reinforced or mineral filled polymer composite, the at least two stiles comprise laminated veneer lumber (LVL), and the at least two rails comprise a composite comprising wood and polyvinyl chloride,
   wherein the composition for the at least one core has a density of at least 600 Kg/m$^3$, and the door has at least one of a sound transmission class (STC) rating or an outdoor/indoor transmission coefficient (OITC) being higher than 30.

2. The door of claim 1, wherein the material for the at least two skins comprise a polymer cured from unsaturated polyester or polybutadiene.

3. The door of claim 1, further comprising:
   a glue bonding the at least one core to the at least two stiles and the at least two rails, wherein the glue comprises a polyurethane reactive hot melt or a polyolefin.

4. The door of claim 1, wherein the at least one core comprises two pieces.

5. The door of claim 1, wherein vermiculite includes expanded vermiculite.

6. The door of claim 1, wherein the inorganic bonding agent in the composition for the at least one core comprises at least one of $Na_2SiO_3$, $SiO_2$, and $CaCO_3$.

7. The door of claim 1, wherein the inorganic bonding agent comprises $Na_2SiO_3$, $SiO_2$, and $CaCO_3$ in a ratio from 2:7:1 to 7:2:1 by weight.

8. The door of claim 6, wherein $SiO_2$ is amorphous.

9. The door of claim 1, wherein the composition of the at least one core comprises vermiculite in a range from about 50% to about 99% by weight and an inorganic bonding agent in a range from about 1% to 50% by weight based on the total weight of the composition.

10. The door of claim 1, wherein the composition of the at least one core comprises vermiculite in a range from about 75% to about 95% by weight and an inorganic bonding agent in a range from about 5% to about 25% by weight based on the total weight of the composition.

11. The door of claim 1, wherein the composition for the at least one core has a density in a range from 600 Kg/m$^3$ to 3,000 Kg/m$^3$.

12. The door of claim 1, wherein the door has an OITC in a range of from 30 to 40.

13. The door of claim 1, wherein the door has an OITC in a range of from 33 to 35.

14. A method of making the door of claim 1 comprising:
forming the at least one core for the door comprising vermiculite and the inorganic bonding agent.

15. The method of claim 14, wherein the step of forming the at least one core comprises steps of:
expanding vermiculite particles to form expanded vermiculite;
forming a mixture of expanded vermiculite with the inorganic bonding agent during a moistened state;
molding the mixture of expanded vermiculite with the inorganic bonding agent at an increased temperature under compression so as to form a panel for the at least one core.

16. The method of claim 14, further comprising:
bonding the at least one core with at least two stiles aligned vertically along two vertical edges of the door and at least two rails aligned horizontally along two horizontal edges; and
applying at least two skins to the at least one core, a first skin on a first side of the at least one core and a second skin on a second side of the at least one core.

17. A door comprising:
at least two skins including a first skin and a second skin; and
at least one core disposed between the first skin and the second skin and comprising a composition comprising vermiculite and an inorganic bonding agent;
wherein the inorganic bonding agent comprises $Na_2SiO_3$, $SiO_2$, and $CaCO_3$ in a ratio from 2:7:1 to 7:2:1 by weight,
wherein the composition for the at least one core has a density of at least 600 Kg/m$^3$, and the door has at least one of a sound transmission class (STC) rating or an outdoor/indoor transmission coefficient (OITC) being higher than 30.

18. A door comprising:
at least two skins including a first skin and a second skin; and
at least one core disposed between the first skin and the second skin and comprising a composition comprising vermiculite and an inorganic bonding agent;
wherein the inorganic bonding agent in the composition for the at least one core comprises at least one of $Na_2SiO_3$, $SiO_2$, and $CaCO_3$, $SiO_2$ being amorphous,
wherein the composition for the at least one core has a density of at least 600 Kg/m$^3$, and the door has at least one of a sound transmission class (STC) rating or an outdoor/indoor transmission coefficient (OITC) being higher than 30.

* * * * *

UNITED STATES PATENT AND TRADEMARK OFFICE
CERTIFICATE OF CORRECTION

PATENT NO. : 10,246,934 B2
APPLICATION NO. : 15/849941
DATED : April 2, 2019
INVENTOR(S) : Shirley Wang et al.

Page 1 of 1

It is certified that error appears in the above-identified patent and that said Letters Patent is hereby corrected as shown below:

In the Claims

Claim 1, Column 10, Line 27, delete "in-between" and insert -- between --

Claim 1, Column 10, Line 29, delete "comprises" and insert -- comprise --

Signed and Sealed this
Seventh Day of May, 2019

Andrei Iancu
*Director of the United States Patent and Trademark Office*